(12) United States Patent
Metzger

(10) Patent No.: US 7,182,564 B2
(45) Date of Patent: Feb. 27, 2007

(54) THREADED RING

(75) Inventor: Heinz Metzger, Kirchheim (DE)

(73) Assignee: Spieth-Maschinenelemente GmbH & Co. KG, Esslingen (DE)

( * ) Notice: Subject to any disclaimer, the term of this patent is extended or adjusted under 35 U.S.C. 154(b) by 0 days.

(21) Appl. No.: 10/532,116

(22) PCT Filed: Oct. 24, 2003

(86) PCT No.: PCT/EP03/11777

§ 371 (c)(1),
(2), (4) Date: Apr. 21, 2005

(87) PCT Pub. No.: WO2004/042242

PCT Pub. Date: May 21, 2004

(65) Prior Publication Data

US 2006/0013673 A1  Jan. 19, 2006

(51) Int. Cl.
*F16B 39/02* (2006.01)
(52) U.S. Cl. .................. 411/286; 411/288; 411/290
(58) Field of Classification Search ........ 411/285–291, 411/433, 437
See application file for complete search history.

(56) References Cited

U.S. PATENT DOCUMENTS

| | | | | |
|---|---|---|---|---|
| 609,144 | A * | 8/1898 | Goddin | 411/236 |
| 5,472,245 | A * | 12/1995 | Meske et al. | 285/414 |
| 5,540,529 | A * | 7/1996 | Jansson et al. | 411/291 |
| 5,609,456 | A * | 3/1997 | Joki | 411/433 |
| 5,634,753 | A * | 6/1997 | Goellner | 411/288 |
| 5,662,445 | A * | 9/1997 | Harbottle et al. | 411/433 |

FOREIGN PATENT DOCUMENTS

| | | |
|---|---|---|
| DE | 98 395 C | 2/1897 |
| DE | 16 75 685 B | 1/1970 |
| EP | 0 794 338 A | 9/1997 |

* cited by examiner

*Primary Examiner*—Flemming Saether
(74) *Attorney, Agent, or Firm*—Roylance, Abrams, Berdo & Goodman, L.L.P.

(57) ABSTRACT

A threaded ring has a single-piece body provided with an internal screw thread and two parts (1 and 3). The first part forms an adjusting ring having an end face (11) located in a radial plane. The second part (3) forms a retaining ring connected to the first part (1) of the body by an elastically flexible wall part (29) of the body forming a gap (15) between the two parts of the body (1 and 3). An actuating device (31) permits the geometry of the gap (15) to be adjusted due to the elastic flexibility of the wall element (29). The second part (3) of the body, used as a retaining ring, has a peripheral region (21) for the formation of the elastically flexible wall element (29), and has a smaller outer diameter than the first part (1). The outer diameter of the peripheral region is located on a smaller radius than the radially outer end (17) of the gap (15). The outer end of the gap, in turn, is located on a smaller radius than the periphery (19) of the first part (1) of the body. The peripheral region (21) of the second part (3), with a reduced diameter, ends at an axial distance from the gap (15), defining the extension of the flexible wall element (29) in the axial direction.

6 Claims, 1 Drawing Sheet

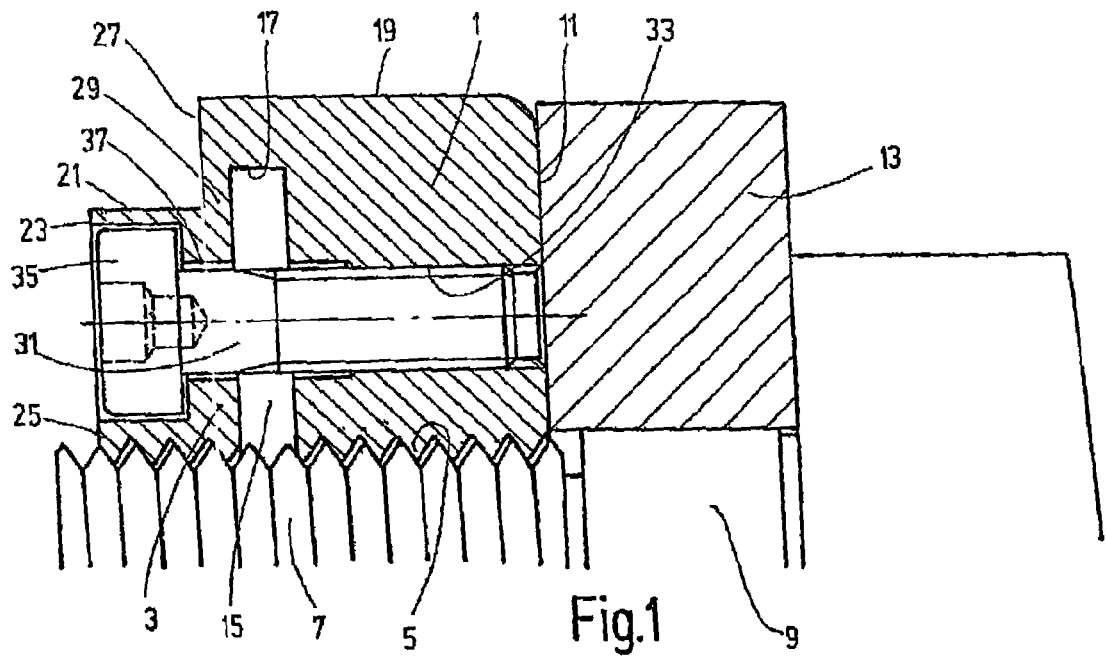
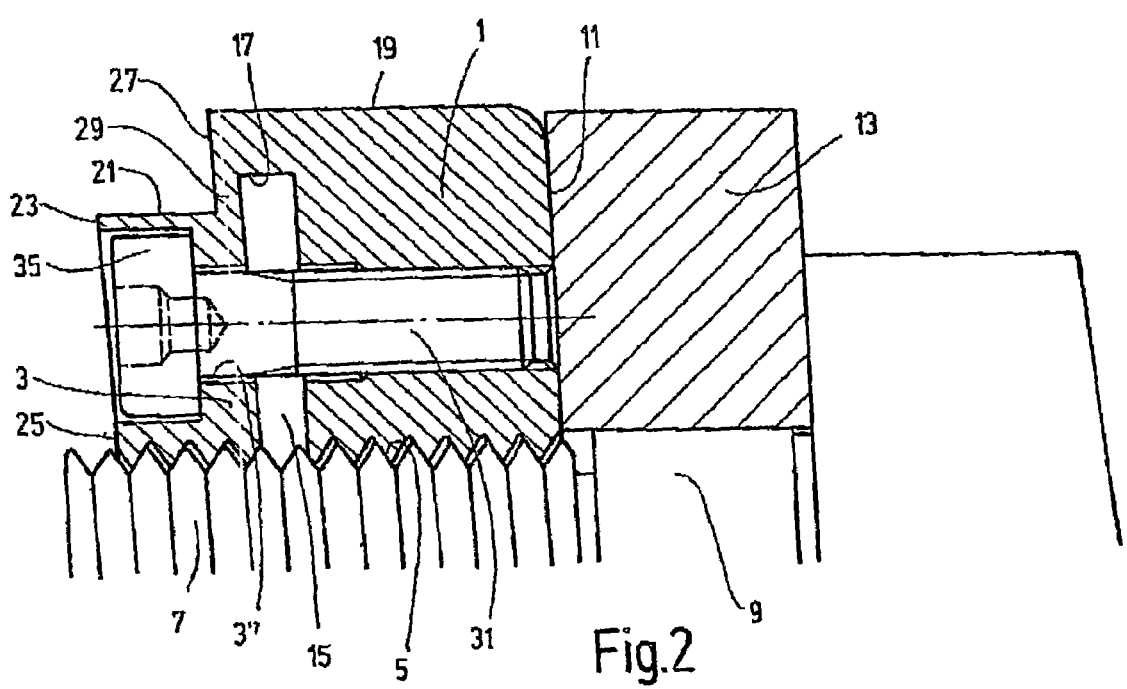

THREADED RING

BACKGROUND OF THE PRESENT INVENTION

The present invention relates to a threaded ring having a one-piece body provided with internal threading and two body components. One body component is in the form of a set collar with a planar surface on the end in a radial plane. The other body component forms a retaining ring connected to the first component to form a gap positioned between the two body components by an elastically flexible wall component. An actuating mechanism permits the geometry of the gap to be adjusted on the basis of the elastic flexibility of the wall component

BACKGROUND OF THE INVENTION

Threaded rings of this type are disclosed in DE Patent Application 1 675 685, for example, are commercially available, and are applied in various areas of mechanical engineering. The body component forming the planar face serves as a high-precision nut seated on the external threading of a shaft or spindle. The axial position of the nut may be determined with high accuracy by the second body component functioning as a retaining ring. The threaded flank clearance present between external threading and internal threading is eliminated by suitably modifying the gap between the two body components by the actuating device. Such modification is made possible by the elastic flexibility of the wall component joining the body components. Set screws which permit reciprocal tightening of the set collar and the retaining ring may be provided as actuating mechanism.

The set collar may function as an adjusting nut. The end face of the set collar forms a contact surface for positioning of rolling bearings on shafts or as a precisely positioned shaft collar or the like.

In the instances of the disclosed threaded ring described in the foregoing, the gap between the body components is formed by two gap sections offset from each other in the axial direction. One gap section extends from the threaded bore to the vicinity of the circumference of the threaded ring. The other gap section extends radially inward from the circumferential surface to the vicinity of the threaded bore. The two gap sections are separated by the elastically flexible wall component which connects the two body components. The wall thickness selected for the flexible wall component is such that this wall component is sufficiently elastically flexible that the geometry of the gap may be adjusted by the set screws. The set screws serve as an actuating mechanism so that the threaded flank clearance is eliminated, and the retaining effect desired is achieved by tensioning the two body components.

The relatively high production cost is a disadvantage of the disclosed threaded ring.

SUMMARY OF THE INVENTION

An object of the present invention is to provide a threaded ring of this type, which may be produced cost effectively by simple means.

According to the present invention, this object is attained with a threaded ring where the second body component serves as retaining ring, and has a circumferential area forming an elastically flexible wall component. The external diameter of that circumferential area is reduced in diameter in comparison to that of the first body component. The circumferential area diameter extends over a radius smaller than that of the radially external end of the gap. The gap radius, in turn, extends over a radius smaller than the circumference of the first body component. The circumferential area of reduced diameter of the second body component ends at an axial distance which defines the extent of the flexible wall component in the axial direction.

For the present invention, the elastically flexible wall component is not formed by two separate gap sections which between themselves delimit the wall component. Rather, a circumferential area of reduced diameter is formed which ends a certain distance from the gap in the axial direction. The radially external end of the gap extends over a radius larger than that of the circumferential area in the area of the step joining the circumferential area of reduced diameter to the circumference of the first body component. A wall component adjoins the gap and extends in the axial direction to a distance corresponding to the distance between the gap and the end of the circumferential area of reduced diameter. The value selected for this distance determining the thickness of the wall component is such that the elastic flexibility desired for this wall component is achieved.

The production of two gap sections for formation of the flexible wall component is replaced in the present invention by production of a single one-part gap as an internal recess. The external machining of the second body component is required in order in particular areas to reduce the external diameter of this body component. This reduction may be accomplished by simple machining, so that production of the threaded ring of the present invention is greatly simplified. An additional advantage is provided in that no gap section open to the exterior is present on the threaded ring. Accordingly, the threaded ring of the present invention has a closed circumferential profile. Among other things, this closed circumferential profile prevents the danger of possible deposit of foreign substances during operation in the open gap area on the circumference, such as impurities in lubricants, abraded particles, chips, or the like. Such deposit might lead to the formation of an unbalancing mass on the circumference of the threaded ring.

The circumferential area of reduced external diameter of the second body component preferably is in the form of a cylindrical circumferential surface which extends through the end edge adjacent to the end surface of the second body component to the flexible wall component. Production of a circumferential surface extending from the end edge is extremely simple from the viewpoint of production technology.

The actuating mechanism for modifying the geometry of the gap may include conventional set screws uniformly distributed over a coaxial graduated circle. The set screws extend through the gap in parallel with the axis, and rest by their screw heads on the second body component.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 1 is a side elevational view in section of only one-half side of an embodiment of a threaded ring according to the present invention on a threaded spindle, the illustration being simplified for the sake of greater clarity of presentation of the principle of operation with the threaded flank clearance being shown enlarged and the threaded ring being shown in the unlocked state; and FIG. 2 is a side elevational view in section of the threaded ring of FIG. 1, but with the screw-on threaded ring shown locked in position.

DETAILED DESCRIPTION OF THE INVENTION

The threaded ring shown in FIG. 1 has two primary components, specifically a first body component 1 which functions as set collar or adjusting nut and a second body component 3 which forms a retaining ring. The two body components 1 and 3 are provided with continuous internal threading 5 by which they are screwed on a section of a spindle 9 provided with external threading 7. The body component 1 has on the end a planar surface 11 functioning as contact surface for fixing the position of an annular component 13 seated on the spindle 9 as shaft collar.

Between the two body components 1 and 3, a gap 15 extends in the radial direction from the internal threading. A radially outer end 17 of the gap is spaced at a radial distance from the circumference or circumferential area 19 of the first body component 1. The second body component 3 has a circumferential area 21 with a smaller external diameter than the external circumference 19 of the first body component 1. This circumferential area 21 of reduced diameter extends in the axial direction from the end edge 23 adjoining the front surface 25 of the second body component 3 to the vicinity of the gap 15. A step 27 connects the circumferential area 21 to the circumference 19 of the first body component 1 and delimits, together with the gap 15, a wall component 29 joining the first body component 1 and second body component 3 as one piece. The thickness selected for this wall component 29 is determined by the distance between the gap 15 and the axially inner end of the circumferential area 21 to form a weak point and to provide a flexible wall component. When the threaded ring is produced from steel material, wall component 29 permits flexible adjustment of the second body component 3 in relation to the first body component 1, with corresponding adjustment of the geometry of the gap 15. The gap width is modified locally, for example.

Set screws 31 extend through the gap 15 in parallel with the axis and into threaded bores 33 in the first body component 1. Their screw heads 35 rest or bear against the second body component 3. The set screws are an actuating mechanism for adjustment of the geometry of the gap 15. Set screws 31 are uniformly distributed over a graduated circle concentric with the axis of the threaded ring, six set screws being provided, for example. In the present example, the set screws 31 are configured as screws with recessed hexagon sockets in heads 35. The heads 35 are seated in enlarged end sections of associated through bores 37 so that the free ends of heads 35 are more or less flush with the outer front surface 25 of the second body component 3.

FIG. 1 shows the threaded ring in the unsecured state, with a threaded flank clearance present in the threading engagement of internal threading 5 and external threading 7. The clearance is shown enlarged for the sake of clarity of presentation. As is to be seen, the flank surfaces of the internal threading 5 on the right side in the drawing are positioned a distance from the flank surfaces of the external threading 7 on the left side in the drawing.

FIG. 2 shows the threaded ring in the secured state, as a result of tightening of the set screws 31. The second body component 3 is braced against the first body component 1 (the drawing being exaggerated in that the front surface 25 of the body component 3 is slightly inclined toward the end surface of the screw heads 35). For the second body component 3, the flank surfaces of the internal threading 5 is positioned on the right side rest on the left flank surfaces of the external threading 7. For the first body component 1, the left flank surfaces of the internal threading 5 rest on right flank surfaces of the external threading 7. In this manner, the unit of the threaded ring made up of body components 1 and 3 braced against each other is secured.

The threaded ring of the present invention is designed to be rotationally symmetrical and has no grooves, slots, etc. generating unbalance. The set screws 31 evenly distributed over a concentric graduated circle, in conjunction with the flexible configuration of the wall component 29, produce uniform clamping forces on the threading. These clamping forces ensure intensive contact of internal and external threading 5 and 7 and accordingly high axial rigidity of the threaded ring over the entire circumference. Any form defect adjustments and surface compressions which may be present may be evened out during assembly by increased tensioning of the body components 1 and 3. The planar surface 11 of the first body component 1 functioning as set collar or tightening ring may be adjusted by targeted uniform tightening of the set screws 31 until complete balance is achieved. If necessary, individual set screws 31 may be additionally tightened to compensate for tension on one side caused by the smallest errors of plane extension of the adjacent components.

The mutual positioning of gap 15 and the axially inner end of the circumferential area 21 of reduced diameter on the second body component 3 defines the wall thickness of the elastically flexible wall component 29. Configuration of the circumferential area 21 is extremely simple with respect to production technology. The degree of flexibility of the wall component 29 is also determined by the distance between the radially outer end 17 of the gap 15 and the circumference 19 of the first body component 1. This radial distance may be determined with no problems with respect to production by selection of the depth of recess of the inner recess forming the gap 15.

While one embodiment has been chosen to illustrate the invention, it will be understood by those skilled in the art that various changes and modifications can be made therein without departing from the scope of the invention as defined in the appended claims.

What is claimed is:

1. A threaded ring for threadedly engaging an externally threaded section of a spindle, comprising:
   a one-piece body having first and second body components and having a longitudinal axis, said first body component forming a set collar with a planar surface on one end thereof extending in a radial plane relative to said longitudinal axis, said second body component forming a retaining ring connected to said first body component and having a front surface;
   a gap between said body components having a radially outer end;
   an elastically flexible wall component of said body connecting said body components;
   a first circumferential area on said first body component;
   a second cylindrical circumferential area on said second body component for forming said flexible wall component, said second circumferential surface being spaced radially from said longitudinal axis by a distance less than radial spacings of said first circumferential area and of said radially outer end from said longitudinal axis, said radially outer end being spaced radially from said longitudinal axis by a distance less than the radial spacing of said first circumferential area from said longitudinal axis, said second circumferential area ending at an axial distance from said gap to define a dimension of said flexible wall component in an axial direction and extending from said front surface to said flexible wall component; and a plurality of set screws coupled to said body components to adjust geometry of said gap by adjustment of said flexible wall.

2. A threaded ring according to claim 1 wherein said set screws are positioned evenly on a circle coaxial with said longitudinal axis, and have screw heads engaging said second body component.

3. A threaded ring according to claim 2 wherein said second body component has recesses in said front surface thereof; and
said heads of said set screws are seated in said recesses.

4. A threaded ring according to claim 3 wherein said heads of said set screws have hexagonal sockets; and
free end surfaces of said heads of said set screws are substantially flush with said front surface when said heads are received in said recesses.

5. A threaded ring according to claim 1 wherein said set screws have heads bearing on said second body component and have threaded shanks threadedly engaging said first body component.

6. A threaded ring according to claim 1 wherein said first and second body components have internal threads threadedly engaged on an externally threaded portion of a spindle.

* * * * *